United States Patent Office 3,627,552
Patented Dec. 14, 1971

3,627,552
PIGMENTS COMPRISING NICKEL SALTS OF IMINOHETEROCYCLICAMIDES
Albert S. Matlack, Hackessin, Del., assignor to Hercules Incorporated, Wilmington, Del.
No Drawing. Original application Nov. 2, 1967, Ser. No. 680,037, now Patent No. 3,576,012. Divided and this application Feb. 18, 1970, Ser. No. 14,859
Int. Cl. C08h 17/14
U.S. Cl. 106—288 Q                 4 Claims

ABSTRACT OF THE DISCLOSURE

Highly colored nickel salts or chelates of iminoheterocyclic carboxamides or carbothiamides suitable as pigments are described. The nickel salts are prepared by reacting a nickel salt of a weak acid with the desired iminoheterocyclic carboxamide or carbothiamide, as for example, with 2-iminocoumarin-3-carboxamide, which in turn can be preformed or formed in situ by condensing the appropriate aldehyde with a cyanoacetamide or cyanothioacetamide. Pigmentary mixed chelates are also formed in the same manner by reacting the nickel salt with a mixture of the desired iminoheterocyclic carboxamide or carbothiamide and at least one other chelating agent such as, for example, dimethylglyoxime, 1-nitroso-2- naphthol, etc.

---

This application is a division of U.S. application Ser. No. 680,037 filed Nov. 2, 1967, now U.S. Pat. No. 3,576,012.

This invention relates to novel nickel compounds which are nickel salts of iminoheterocyclic carboxamides or carbothiamides and which find significant utility as pigments.

More specifically, the present invention is directed to water-insoluble nickel salts having the formula I    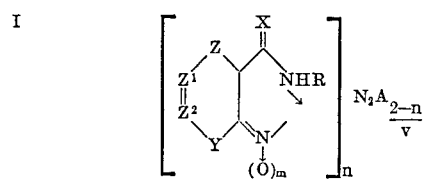

or

II   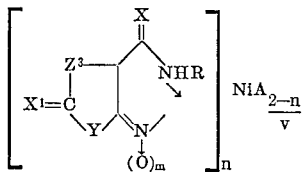

wherein R is hydrogen, —NHalkyl, —NHacyl, —NHaryl, —NHaralkyl, —N=CHaryl or a heterocyclic substituted alkyl group; X is oxygen or sulfur; $X^1$ is oxygen, sulfur, $NR^1$ or $CHR^1$ where $R^1$ is hydrogen or an inert organic radical; Y is oxygen, sulfur, $NR^1$ or together with $X^1$ forms a 5–7 membered ring; Z is nitrogen,

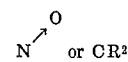

where $R^2$ is hydrogen, hydroxyl or a hydrocarbon group; $Z^1$ is nitrogen or $CR^3$ where $R^3$ is hydrogen, an inert organic or inorganic radical, or together with $R^2$ forms a 5–7 membered ring; $Z^2$ is nitrogen or $CR^4$ where $R^4$ is hydrogen, hydroxyl, an inert organic radical, or together with $R^3$ forms a 5–7 membered ring; $Z^3$ is nitrogen or $CR^5$ where $R^5$ is hydrogen, an inert organic radical, or together with $X^1$ forms a 5–7 membered ring; A is an anion; m is 0 or 1; n is 1 or 2; and v is the valence of anion A, with the further provision that at least one of Z, $Z^1$ and $Z^2$ contains carbon.

In the above formulae, R as stated is hydrogen, alkyl, —NHalkyl, —NHacyl, —NHaryl, —NHaralkyl, —N=CHaryl or a heterocyclic substituted alkyl group. When R is alkyl or —NHalkyl, the alkyl group preferably contains 1 to 20 carbon atoms and is, for example, methyl, ethyl, n-propyl, isoproyl, butyl, isobutyl, tert-butyl, pentyl, hexyl, octyl, decyl, dodecyl, tetradecyl, hexadecyl, octadecyl, 2-ethylhexyl, 2-cyclohexylethyl and the like. When R is —NHacyl, the acyl group preferably contains 2 to 20 carbon atoms and is, for example, acetyl, propionyl, butanoyl, pentanoyl, decanoyl, octadecanoyl, benzoyl, phenylacetyl and the like. The aryl groups in —NHaryl, —NHaralkyl and —N=CHaryl can comprise phenyl, 1-naphthyl, 2-naphthyl, xylyl, 4-methoxyphenyl and 4-chlorophenyl groups, the aralkyl groups preferably being phenalkyl groups such as benzyl, phenethyl and the like. The heterocyclic substituted alkyl groups are typically picolyl, methylpicolyl, dimethylpicolyl and the like.

The inert organic radicals which $R^1$, $R^3$, $R^4$ and $R^5$ can comprise are numerous and varied and are preferably hydrocarbon or substituted hydrocarbon groups such as alkyl groups containing 1 to 20 carbon atoms, aryl or cycloalkyl groups containing 6 to 18 carbon atoms, aralkyl or alkaryl groups containing 7 to 19 carbon atoms or any of the above groups also containing oxygen, sulfur and/or nitrogen substitutents. Particularly preferred groups which $R^1$ can comprise include alkyl, alkoxy, carbamoyl, sulfonamide, alkoxycarbonyl and the like. The hydrocarbon groups which $R^2$ can comprise are preferably alkyl groups containing 1 to 20 carbon atoms, aryl groups containing 6 to 18 carbon atoms, and alkaryl or aralkyl groups containing 7 to 19 carbon atoms. The preferred inert inorganic radicals which $R^3$ can also comprise include cyano, nitro, trichloromethyl, trifluoromethyl, sulfamoyl, carbamoyl and the like. A as stated, is an anion of valance v. Preferred anions include halide, alkanoate, thiocyanate, cyanide, sulfate, nitrate, phosphate and hydroxide, and most preferably chloride, bromide, thiocyanate, cyanide, sulfate, nitrate, phosphate, hydroxide, acetate, propionate, 2-ethylhexanoate, octanoate and the like.

The nickel compounds of the present invention are highly colored, insoluble salts which range in color from orange to red to maroon. The structure of the nickel compounds, as given above, has not been established unequivocally. However, from the nature of several analogs, it appears that an essential feature of the nickel salt or chelate (as such salts are often referred to) is a six-membered ring containing 2 nitrogen atoms and one nickel atom. Hence, it is postulated that the nickel-containing ring has the structure

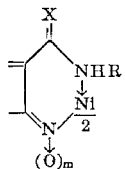

where, X, R and $m$ are as defined above. It is understood, of course, that the exact hydrogen which is replaced by nickel is not known with certainty. It is also postulated that the ring adjacent to the nickel-containing ring must contain a minimum of one hetero atom which can be nitrogen, oxygen or sulfur, a minimum of 3 carbon atoms, and a conjugated system of alternating single and double bonds.

Exemplary of compounds represented by Formula I above are the nickel salts of the 2-imino-2H-1-pyran-3-carboxamides,
2-imino-2H-1-thiapyran-3-carboxamides,
1,2-dihydro-2-iminopyridine-3-carboxamides,
1,6-dihydro-6-iminopyridazine-5-carboxamides,
1,6-dihydro-6-iminopyrimidine-5-carboxamides,
1,2-dihydro-2-iminopyrazine-3-carboxamides,
6-imino-6H-1,2-oxazine-5-carboxamides,
6-imino-6H-1,3-oxazine-5-carboxamides,
2-imino-2H-1,4-oxazine-3-carboxamides,
6-imino-6H-1,2-thiazine-5-carboxamides,
6-imino-6H-1,3-thiazine-5-carboxamides,
2-imino-2H-1,4-thiazine-3-carboxamides,
1,6-dihydro-6-imino-1,2,4-triazine-5-carboxamides,
1,6-dihydro-6-imino-1,3,4-triazine-5-carboxamides,
6-imino-6H-1,2,4-oxadiazine-5-carboxamides,
6-imino-6H-1,3,4-oxadiazine-5-carboxamides,
6-imino-6H-1,2,4-thiadiazine-5-carboxamides, and
6-imino-6H-1,3,4-thiadiazine-5-carboxamides, as well as the corresponding carbothiamides of the above compounds. Typical compounds represented by Formula II above are the nickel salts of the 2,5-dihydro-2-imino-5-oxofuran-3-carboxamides,
2,5-dihydro-2-imino-5-thioxofuran-3-carboxamides,
2,5-dihydro-2,5-diiminofuran-3-carboxamides,
2,5-dihydro-2-imino-5-substituted
  iminofuran-3-carboxamides,
5-alkylidene-2,5-dihydro-2-iminofuran-3-carboxamides,
2,5-dihydro-2-imino-5-oxothiophene-3-carboxamides,
2,5-dihydro-2-imino-5-thioxothiophene-3-carboxamides,
2,5-dihydro-2,5-diiminothiophene-3-carboxamides,
2,5-dihydro-2-imino-5-substituded
  iminothiophene-3-carboxamides,
5-alkylidene-2,5-dihydro-2-iminothiophene-3-carboxamides,
2-imino-5-oxo-Δ³pyrroline-3-carboxamides,
2-imino-5-thioxo-Δ³pyrroline-3-carboxamides,
2,5-diimino-Δ³pyrroline-3-carboxamides,
2-imino-5-substituted
  imino-Δ³pyrroline-3-carboxamides,
5-alkylidene-2-imino-Δ³pyrroline-3-carboxamides,
5-imino-2-oxo-Δ³oxazoline-4-carboxamides,
5-imino-2-thioxo-Δ³oxazoline-4-carboxamides,
2,5-diimino-Δ³oxazoline-4-carboxamides,
5-imino-2-substituted
  imino-Δ³thiazoline-4-carboxamides,
2-alkylidene-5-imino-Δ³oxazoline-4-carboxamides,
5-imino-2-oxo-Δ³thiazoline-4-carboxamides,
5-imino-2-thioxo-Δ³thiazoline-4-carboxamides,
2,5-diimino-Δ³thiazoline-4-carboxamides,
5-imino-2-substituted
  imino-Δ³thiazoline-4-carboxamides,
2-alkylidene-5-imino-Δ³thiazoline-4-carboxamides,
5-imino-2-oxo-Δ³imidazoline-4-carboxamides,
5-imino-2-thioxo-Δ³imidazoline-4-carboxamides,
2,5-diimino-Δ³imidazoline-4-carboxamides,
5-imino-2-substituted
  imino-Δ³imidazoline-4-carboxamides, and
2-alkylidene-5-imino-Δ³imidazoline-4-carboxamides, as well as the corresponding carbothiamides of the above compounds.

The preferred compounds of the invention include such nickel salts as those of the 2-imino-2H-1-benzopyran-3-carboxamides or -carbothiamides (otherwise known as and referred to hereinafter as the 2-iminocoumarin-3-carboxamides or -carbothiamides), the 1-alkyl-1,2-dihydro-2-iminobenzopyridine-3-carboxamides or -carbothiamides (otherwise referred to as the 1-alkyl-1,2-dihydro-2-iminoquinoline-3-carboxamides or -carbothiamides) and the 1-aryl-1,6-dihydro-6-iminopyridazine-5-carboxamides or -carbothiamides. Particularly preferred are the nickel salts of the 2-iminocoumarin-3-carboxamides or -carbothiamides having the formula

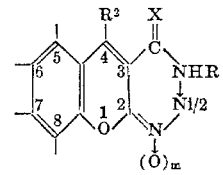

where R, R², X and $m$ are as indicated above, such as the nickel salts of 2-oximinocoumarin-3-carboxamide,
2-imino-6-methylcoumarin-3-carboxamide,
2-imino-7-methylcoumarin-3-carboxamide,
2-imino-8-methylcoumarin-3-carboxamide,
2-imino-6-tert-octylcoumarin-3-carboxamide,
2-imino-6,8-dimethylcoumarin-3-carboxamide,
8-tert-butyl-2-imino-6-methylcoumarin-3-carboxamide,
6-tert-butyl-2-imino-8-methylcoumarin-3-carboxamide,
6-chloro-2-iminocoumarin-3-carboxamide,
6-tert-butyl-8-chloro-2-iminocoumarin-3-carboxamide,
6,8-dichloro-2-iminocoumarin-3-carboxamide,
6-bromo-2-iminocoumarin-3-carboxamide,
6,8-dibromo-2-iminocoumarin-3-carboxamide,
7-hydroxy-2-iminocoumarin-3-carboxamide,
2-imino-6-methoxycoumarin-3-carboxamide,
2-imino-7-methoxycoumarin-3-carboxamide,
2-imino-8-methoxycoumarin-3-carboxamide,
2-imino-6-methylthiocoumarin-3-carboxamide,
2-imino-7-trifluoromethylcoumarin-3-carboxamide,
2-imino-6-nitrocoumarin-3-carboxamide,
2-imino-8-nitrocoumarin-3-carboxamide, 2-imino-6-phenylazocoumarin-3-carboxamide,
7-dimethylamino-2-iminocoumarin-3-carboxamide,
2-imino-5,6-benzocoumarin-3-carboxamide,
2-imino-6,7-benzocoumarin-3-carboxamide,
8-bromo-2-imino-5,6-benzocoumarin-3-carboxamide,
6-benzenesulfonyl-2-iminocoumarin-3-carboxamide, and the like, and the 3-carbothiamide analogs of any of the above compounds.

Another particularly preferred class are the 1-aryl-1,6-dihydro-6-iminopyridazine-5-carboxamides or -carbothiamides such as 1,6-dihydro-6-imino-1-(4-nitrophenyl)pyridazine-5-carboxamide,
1-(4-chlorophenyl)-1,6-dihydro-6-iminopyridazine-5-carboxamide,
1-(2,4,6-trichlorophenyl)-1,6-dihydro-6-iminopyridazine-5-carboxamide,
1-(2,5-dichlorophenyl)-1,5-dihydro-6-iminopyridazine-5-carboxamide,
1-(3-trifluoromethylphenyl)-1,6-dihydro-6-iminopyridazine-5-carboxamide,
1,6-dihydro-6-imino-1-(4-methoxyphenyl)pyridazine-5-carboxamide,
1,6-dihydro-6-imino-1-(2-methylphenyl)pyridazine-5-carboxamide,
1,6-dihydro-6-imino-1-(3-methylphenyl)pyridazine-5-carboxamide,
1-(4-ethoxyphenyl)-1,6-dihydro-6-iminopyridazine-5-carboxamide,
1-(3-benzenesulfonylphenyl)-1,6-dihydro-6-iminopyridazine-5-carboxamide,
1-(3-carbamoylphenyl)-1,6-dihydro-6-iminopyridazine-5-carboxamide,
1,6-dihydro-1-(4-hydroxphenyl)-6-iminopyridazine-5-carboxamide, and the corresponding carbothiamides, and the 1-alkyl-1,6-dihydro-6-iminopyridazine-5-carboxamides or -carbothiamides such as the 1,6-dihydro-6-imino-1-methylpyridazine-5-carboxamide,
1-ethyl-1,6-dihydro-6-iminopyridazine-5-carboxamide,
1,6-dihydro-6-imino-1-propylpyridazine-5-carboxamide,
1-butyl-1,6-dihydro-6-iminopyridazine-5-carboxamide,
1-(2-ethylhexyl)-1,6-dihydro-6-iminopyridazine-5-carboxamide or the corresponding carbothiamides. The pyridazine ring can also contain substituents other than those listed above, as for example, keto, ester, amido, sulfonamido or aryl groups, particularly in the 3 position. Typical of such substituents are acetyl, propionyl, benzoyl, cyano, carbamoyl, benzenesulfonyl, ethoxycarbonyl, methoxycarbonyl, phenoxycarbonyl, phenyl, 2,5-dichlorophenyl, 4-methoxyphenyl, sulfamoyl and the like.

Still another most preferred class of compounds are the nickel salts of the 1,2 - dihydro - 2 - iminoquinoline-3-carboxamides such as, for example, 1,2,-dihydro-2-imino-1-methylquinoline-3-carboxamide,
1-ethyl-1,2-dihydro-2-iminoquinoline-3-carboxamide,
1,2-dihydro-2-imino-1-propylquinoline-3-carboxamide,
1-(2-ethylhexyl)-1,2-dihydro-2-iminoquinoline-3-carboxamide,
1-(benzyl)-1,2-dihydro-2-iminoquinoline-3-carboxamide,
1,(2,5-dichlorobenzyl)-1,2-dihydro-2-iminoquinoline-3-carboxamide,
1-cyclohexyl-1,2-dihydro-2-iminoquinoline-3-carboxamide,
1,2-dihydro-2-imino-1-(4-nitrobenzyl)quinoline-3-carboxamide,
1-carboxymethyl-1,2-dihydro-2-iminoquinoline-3-carboxamide,
1-(2-cyanoethyl)-1,2-dihydro-2-iminoquinoline-3-carboxamide,
1-carbamoylmethyl-1,2-dihydro-2-iminoquinoline-3-carboxamide,
1-(2-chloroethyl)-1,2-dihydro-2-iminoquinoline-3-carboxamide,
1,2-dihydro-2-imino-1-methoxycarbonylmethylquinoline-3-carboxamide,
1,2-dihydro-2-imino-1-(3-sulfopropyl)quinoline-3-carboxamide,
1,2-dihydro-2-imino-1-(2,4-dinitrophenyl)quinoline-3-carboxamide,
1,2-dihydro-2-imino-1-(4-sulfamoylphenyl)quinoline-3-carboxamide,
1,2-dihydro-2-imino-1-(4-nitrophenyl)quinoline-3-carboxamide,
1,2-dihydro-2-imino-1-phenylquinoline-3-carboxamide,
1-(2,4-diacetylphenyl)-1,2-dihydro-2-iminoquinoline-3-carboxamide,
4-carboxy-1-methyl-1,2-dihydro-2-iminoquinoline-3-carboxamide, and the corresponding carbothiamides. Inert substituents can also be present in the 5, 6, 7 and 8 positions, the halo, alkyl, alkoxy and aryl groups being particularly preferred.

The novel compounds of this invention can be prepared by adding a solution of a nickel salt of a weak acid or a solution of a nickel halide and then a base such as sodium hydroxide, potassium hydroxide, ammonia, triethylamine, sodium carbonate, sodium acetate or the like to an agitated solution or dispersion of the desired iminoheterocyclic carboxamide or carbothiamide in a suitable diluent or solvent using heat, if desired, and then isolating the nickel precipitate by conventional techniques. Preferred solvents for the nickel salt include water, methanol, ethanol, 2-methoxyethanol, dimethylformamide and the like. The diluent for the iminoheterocyclic carboxamide or carbothiamide is preferably the same as that for the nickel salt but can also be acetone, ethyl acetate, benzene, acetonitrile, dioxane and the like.

The nickel salt can also be prepared in a one-step process wherein formation of the iminoheterocyclic carboxamide or carbothiamide (as, for example, by condensation of the appropriate aldehyde and cyanoacetamide or cyanothioacetamide) and subsequent chelation with the nickel salt are carried out in the same phase without prior separation. The isolated nickel compounds prepared by either method can be used as such, or can be purified, as by recrystallization from a suitable solvent, extraction with a suitable solvent, etc. In the case of nickel compounds of the invention prepared in aqueous medium, it is preferred to digest the product with an organic medium such as dimethylformamide, dimethylsulfoxide and the like to induce crystallinity prior to use.

The iminoheterocyclic carboxamides (or carbothiamides) used to form the nickel salts of this invention can be prepared in various ways. For example, the carboxamides of the pyrans and particularly the coumarins can be prepared by condensing the appropriate aldehyde and particularly salicylaldehyde with cyanoacetamide or an N-alkyl substituted cyanoacetamide using the methods of Curtis et al., J. Chem. Soc., 123, 3130–40 (1923) or Schiemenz, Ber. 95, 485 (1962). The carbothiamides can also be prepared in the same manner using cyanothiacetamide or the N-alkyl substituted cyanothiacetamide. The carboxamides (or carbothiamides) of the thiopyrans can also be prepared in the same manner using the thioaldehydes. The carboxamides (or carbothiamides) of the pyridines can be prepared by condensing phenylpropargyl-aldehyde with cyanoacetamide or cyanothiacetamide, as the case may be, followed by treatment with a primary amine. The carboxamides of other 6-membered nitrogen-containing ring compounds, i.e., the pyrimidines, pyridazines, pyrazines and triazines can be prepared by alkylating the carboxamide or carbothiamide of the appropriate amino-substituted ring compound with an alkyl or aryl halide followed by treatment with a base such as potassium hydroxide. Carboxamides of the oxazines and thiazines can be prepared by heating an o-aminophenol (or o-aminobenzenethiol) with 2-cyano-2,2-bisphenoxyacetamide; and the carboxamides of the oxadiazines and thiadiazines can be prepared by heating an acylhydrazide (or thioacylhydrazide) with 2-cyano-2,2-bisphenoxyacetamide. The carboxamides of the thiazolines and imidazolines can be prepared by heating an N-substituted urea, thiourea or guanidine with 2-cyano-2,2-bisphenoxyacetamide; and the carboxamides of the pyrrolines can be prepared by condensing an amide of glyoxylic acid with cyanoacetamide. In the above preparations of the carboxamides of the oxazines, thiazines, triazines, oxadiazines, thiadiazines and thioazolines, a final treatment with a base or the use of base in subsequent reaction with the nickel salt may be necessary to facilitate ring closure. The carboxamides of the other 5-membered ring compounds, i.e., the dihydrofurans, dihydrothiophenes, and oxazolines can be prepared in similar manner. For example, the carboxamides of the dihydrofurans can be prepared according to the methods of Ito et al., Tetrahedron Letters, 3659 (1965), the carboxamides of the dihydrothiophenes by the same methods except that the sulfur analogs of Ito's carbonyl compounds are used, and the carboxamides of the oxazolines by heating an alkyl or aryl carbamate with 2-cyano-2,2-bisphenoxyacetamide, followed by treatment with base. The substituted aldehydes can be prepared from the phenol using such known reactions as the Reimer-Tiemann reaction, the Duff reaction, or the Vilsmeier reaction, etc. (see Die Methoden der Organischen Chemie, 4th Ed., Sauerstoff II, pages 15–412, by Houben-Weyl, George Thieme Verlag, Stuttgart, 1954).

The nickel salts of this invention are characterized by being insoluble in water and litho varnish and highly colored. They are of value as pigments in numerous applications but have particular value as pigments in exterior masstone applications, as for example, in automotive finishes.

The invention will be illustrated by reference to the following examples in which all percentages and parts are by weight unless otherwise specified.

In the examples, the nickel salts were evaluated as pigments by preparing paper drawouts thereof and determining the color visually. The inks used for the drawouts were prepared by mulling the nickel compound in litho varnish to form a masstone ink, and then, if desired, reducing the ink with a white paste, to form a tint ink.

EXAMPLE 1

A solution of 2.4 parts of nickel (II) chloride hexahydrate in 30 parts of anhydrous methanol was added with stirring to a solution of 3.8 parts of 2-iminocoumarin-3-carboxamide (prepared by reacting 10 parts of salicylaldehyde with 10 parts of cyanoacetamide in 60 parts of water and 1 part of 10% potassium hydroxide and permitting to stand over night) in 70 parts of warm methanol containing 0.5 part of sodium. An orange-red solid (97% yield based on the coumarin) which was insoluble in benzene, chloroform, ethylene glycol monomethylether, pyridine, dimethylformamide, 1:1 benzene-ethanol, and water was removed from the solution by filtration, and extracted once with methanol to remove any unreacted starting material, washed with fresh methanol and then dried at 20° C. under vacuum.

The solid product, on analysis for $C_{20}H_{14}N_4NiO_4$, gave:

|  | Found (percent) | Calculated (percent) |
|---|---|---|
| Carbon | 55.12 | 55.47 |
| Hydrogen | 3.35 | 3.26 |
| Nitrogen (Dumas) | 12.71 | 12.94 |
| Nickel (direct ash) | 13.1 | 13.55 | indicating that the product was the nickel salt of 2-imino coumarin-3-carboxamide. The masstone ink (orange-red) when used in a paper drawout and exposed in a fadeometer indicated very good light fastness.

EXAMPLE 2

A mixture of 25.8 parts of 2-hydroxy-1-naphthaldehyde and 12.6 parts of cyanoacetamide was dissolved in 300 parts of absolute ethanol by heating on a steam bath, and piperidine (15 drops) was added to the solution with swirling. The solution was allowed to sit overnight after which time the crystals of 2-imino-5,6-benzocoumarin-3-carboxamide which formed were removed by filtration and washed with absolute ethanol. The crystals recovered above were dissolved in 3,000 parts of dimethylformamide at 100° C., and a solution of 17.1 parts of nickel acetate tetrahydrate in 300 parts of methanol added with agitation and the mixture heated on a steam bath for a few minutes, after which time the mixture was cooled and the nickel salt recovered by filtration, washed with dimethylformamide, then 2-methoxyethanol and finally with methanol, and dried. The nickel salt of 2-imino-5,6-benzocoumarin-3-carboxamide (yield of 82% based on the coumarin) was a red pigment which analyzed 9.73% nitrogen (Dumas) and 10.6% nickel by direct ash (calculated for $C_{28}H_{18}N_4NiO_4$, 10.52% nitrogen, and 11.01% nickel). The masstone ink (brownish maroon) and the tint ink (brownish red) both exhibited excellent light fastness when paper drawouts thereof were exposed in a fadeometer. The pigment of this example was further evaluated by comparing it in a thermosetting acrylic enamel to a blend of equal depth prepared from molybdate orange and quinacridone violet. (Quinacridones are commercially useful pigments widely employed in automotive finishes because of their high degree of light fastness.) Weatherometer and sub-tropical exposures of the panels resulted in less darkeinng in the case of the pigment of Example 2 than in the case of the quinacridone violet-molybdate orange blend.

EXAMPLES 3 TO 25

In each of these examples, the nickel salts of the invention were prepared according to the following general procedure. The desired 2-iminocumarin-3-carboxamide which was to be reacted with the nickel acetate was first prepared by condensing the appropriate aldehyde and cyanoacetamide dissolved in a minimum of anhydrous ethanol, at boiling temperature, if necessary, in the presence of a few drops of piperidine and permitting the reaction mixture to stand until crystallization was complete, after which time the crystals of the 2-iminocoumarin-3-carboxamide which formed were removed by filtration and washed with anhydrous ethanol. The nickel salt of the 2-iminocoumarin-3-carboxamide was then prepared by dissolivng the crystals obtained above in a suitable solvent (using heat, if necessary), adding nickel acetate tetrahydrate to the solution as a solution in methanol with agitation, and continuing the agitation (using heat, if necessary) until the desired nickel salt formed. The nickel salt was next removed from the reaction medium by filtration or centrifugation, and the nickel salt washed thoroughly first with the same solvent as was used for its formation and then with methanol and dried (at 100° C.) under vacuum. Details for these examples and the products obtained are tabulated below in Table 1.

TABLE 1

| Ex. No. | Aldehyde | Solvent [1] | Analog | Yield, percent [2] | Formula | Color [3] |
|---|---|---|---|---|---|---|
| 3 | 5-methyl salicylaldehyde | DMF | 6-methyl | 78 | $C_{22}H_{18}N_4NiO_4$ | OR |
| 4 | 4-methyl salicylaldehyde | MC | 7-methyl | 84 | $C_{22}H_{18}N_4NiO_4$ | O |
| 5 | 3-methyl salicylaldehyde | E | 8-methyl | 20 | $C_{22}H_{18}N_4NiO_4$ | O |
| 6 | 5-tert-octyl salicylaldehyde | MC | 6-tert-octyl | 38 | $C_{36}H_{46}N_4NiO_4$ | OR |
| 7 | 3,5-dimethyl salicylaldehyde | MC | 6,8-dimethyl | 80 | $C_{24}H_{22}N_4NiO_4$ | O |
| 8 | 3-tert-butyl-5-methyl salicylaldehyde | MC | 6-methyl-8-tert-octyl | 74 | $C_{30}H_{34}N_4NiO_4$ | O |
| 9 | 5-tert-butyl-3-methyl salicylaldehyde | MC | 6-tert-butyl-8-methyl | 31 | $C_{30}H_{34}N_4NiO_4$ | O |
| 10 | 5-chloro salicylaldehyde | MC | 6-chloro | 54 | $C_{20}H_{12}Cl_2N_4NiO_4$ | R |
| 11 | 5-tert-butyl-3-chloro salicylaldehyde | MC | 6-tert-butyl-8-chloro | 78 | $C_{28}H_{28}Cl_2N_4NiO_4$ | R |
| 12 | 3,5-dichloro salicylaldehyde | MC | 6,8-dichloro | 84 | $C_{20}H_{10}Cl_4N_4NiO_4$ | R |
| 13 | 5-bromo salicylaldehyde | MC | 6-bromo | 71 | $C_{20}H_{12}Br_2N_4NiO_4$ | M |
| 14 | 3,5-dibromo salicylaldehyde | MC | 6,8-dibromo | 7 | $C_{20}H_{10}Br_4N_4NiO_4$ | BR |
| 15 | 2,4-dihydrox benzaldehyde | DMF | 7-hydroxy | 94 | $C_{20}H_{14}N_4NiO_4$ | O |
| 16 | 5-methoxy salicylaldehyde | DMF | 6-methoxy | 64 | $C_{22}H_{18}N_4NiO_4$ | OR |
| 17 | 4-methoxy salicylaldehyde | DMF | 7-methoxy | 55 | $C_{22}H_{18}N_4NiO_4$ | O |
| 18 | 3-methoxy salicylaldehyde | MC | 8-methoxy | 86 | $C_{22}H_{18}N_4NiO_4$ | O |
| 19 | 5-methylthio salicylaldehyde | MC | 6-methylthio | 74 | $C_{22}H_{18}N_4NiO_4S_2$ | O |
| 20 | 4-triflouromethyl salicylaldehyde | M | 7-trifluoromethyl | 50 | $C_{22}H_{12}F_6N_4NiO_4$ | M |
| 21 | 5-nitro salicylaldehyde | MC:DMF | 6-nitro | 47 | $C_{20}H_{12}N_6NiO_8$ | OR |
| 22 | 3-nitro salidylaldehyde | MC | 8-nitro | 7 | $C_{20}H_{12}N_6NiO_8$ | OR |
| 23 | 5-phenylazo salicylaldehyde | MC | 6-phenylazo | 70 | $C_{32}H_{22}N_8NiO_4$ | BR |
| 24 | 4-dimethylamino salicylaldehyde | MC | 7-dimethylamino | 35 | $C_{24}H_{24}N_6NiO_4$ | R |
| 25 | 2-hydroxy-3-naphthaldehyde | MC | 6,7-benzo | 67 | $C_{28}H_{18}N_4NiO_4$ | B |

| | Analyses | | | | | | | |
|---|---|---|---|---|---|---|---|---|
| | Percent carbon | | Percent hydrogen | | Percent nitrogen (Dumas) | | Percent nickel (by direct ash) | |
| Ex. No. | Theory | Found | Theory | Found | Theory | Found | Theory | Found |
| 3 | 57.30 | 57.06 | 3.93 | 3.68 | 12.15 | 12.04 | 12.73 | 11.9 |
| 4 | 57.30 | 56.99 | 3.93 | 4.47 | 12.15 | 11.69 | 12.73 | 11.76 |
| 5 | 57.30 | 57.18 | 3.93 | 4.19 | 12.15 | 12.13 | 12.73 | 10.69 |
| 6 | 65.76 | 66.24 | 7.05 | 7.32 | 8.52 | 8.27 | 8.93 | 9.4 |
| 7 | 58.93 | 58.81 | 4.53 | 4.85 | 11.45 | 11.72 | 12.00 | 10.84 |
| 8 | | | | | 9.77 | 10.48 | 10.24 | 9.82 |
| 9 | | | | | 9.77 | 10.09 | 10.24 | 10.03 |
| 10 | 47.86 | 47.9 | 2.41 | 2.56 | 11.16 | 11.25 | 11.69 | 11.0 |
| 11 [4] | 54.76 | 54.66 | 4.60 | 4.95 | 9.12 | 8.89 | 9.56 | 9.04 |
| 12 | | | | | 9.82 | 9.92 | 10.28 | 9.85 |
| 13 | 40.65 | 40.40 | 2.05 | 2.20 | 9.48 | 9.07 | 9.93 | 9.17 |
| 14 | | | | | 7.48 | 6.90 | 7.84 | 7.8 |
| 15 | | | | | 12.05 | 11.65 | 12.62 | 11.63 |
| 16 | 53.59 | 53.6 | 3.68 | 3.8 | 11.36 | 11.37 | 11.90 | 11.6 |
| 17 | | | | | 11.36 | 11.45 | 11.90 | 11.5 |
| 18 | | | | | 11.36 | 11.28 | 11.90 | 11.6 |
| 19 | 50.31 | 50.5 | 3.45 | 3.7 | 10.67 | 10.50 | 11.17 | [5] 11.19 |
| 20 | 46.43 | 46.05 | 2.13 | 2.15 | 9.85 | 10.04 | 10.31 | 9.82 |
| 21 | 45.92 | 45.55 | 2.31 | 2.33 | 16.07 | 15.53 | 11.22 | 10.6 |
| 22 | | | | | 15.03 | 14.90 | 10.50 | 10.2 |
| 23 | | | | | 17.48 | 17.31 | 9.15 | 8.8 |
| 24 | 55.52 | 55.26 | 4.66 | 4.83 | 16.19 | 15.60 | 11.30 | 10.8 |
| 25 | | | | | 10.51 | 10.16 | 11.01 | 10.6 |

[1] DMF=dimethylformamide; MC=2-methoxyethanol; E=ethanol; M=methanol; MC:DMF=2-methoxyethanol:dimethylformamide (2:1).
[2] Based on aldehyde.
[3] O=orange; R=red; OR=orange-red; M=maroon; BR=brownish-red; B=brown.
[4] Also contained 25.4% chlorine (theory 24.85%).
[5] As dimethylglyoxime, using perchloric acid digestion.

EXAMPLE 26

To an aqueous solution containing 1.72 parts of 2-hydroxy-1-naphthaldehyde, 0.66 part of 85% potassium hydroxide and 15 parts of water was added a solution of 0.84 part cyanoacetamide in 15 parts of water, and the mixture blanketed with nitrogen. After 2 hours, the bright yellow solid was removed from the mixture and washed with water. The 2-imino-5,6-benzocoumarin-3-carboxamide product (1.62 parts, 68% of theory) contained 11.7% nitrogen (theory, 11.8%) and fluoresced under ultraviolet light.

To a mixture of 0.5 part of the above iminocoumarin and 0.25 part of nickel chloride hexahydrate ground to a fine slurry in 5 parts of water was added 300 parts water and 2 parts of 10% sulfuric acid. The solution which formed was filtered to remove undissolved solids and then made basic with a solution of 0.53 part of sodium hydroxide in 5 parts of water. The nickel salt which formed (designated product A) was removed from the mixture by filtration, washed with water and then dried for 7 hours at 100° C. and 0.1 mm. pressure. X-ray analysis of the nickel salt showed little, if any, crystallinity and 3 broad diffuse bands unlike the sharp crystalline lines of the nickel salt of Example 2.

Product A was next ground with water, filtered, heated with 20 parts of dimethylformamide at 100° C. for 2 hours and then recovered. This product (designated product B), after drying for 8 hours at 100° C. and 0.55 mm. pressure exhibited, on X-ray analysis, basically the same pattern as the nickel salt of Example 2, the crystallinity, however, being lower with a slight shift in the spacing at 7A. Product B contained 10.64% nitrogen (theory, 10.52%) and 10.92% nickel (theory, 11.01%) and gave a masstone color of red.

EXAMPLE 27

The nickel salt of Example 22 was produced in a one step process by mixing at room temperature a solution of 1.67 parts of 3-nitrosalicylaldehyde and 0.84 part of cyanoacetamide in 37 parts 2-methoxyethanol with a solution of 1.24 parts of nickel acetate tetrahydrate and 1.00 part sodium acetate in 16 parts of methanol, permitting the mixture to stand for 4 days, and then recovering the orange-red solid which formed by filtration and washing the solid with 2-methoxyethanol. To the filtrate (including washings) was added a solution of 0.09 part of 85% potassium hydroxide in 5 parts of 2-methoxyethanol and, after permitting to set for 1 day, a second crop of solid was filtered off and washed with methanol. Third and fourth crops of solid were recovered in the same manner as above except that a methanolic solution of potassium hydroxide was used and the mixtures permitted to stand for 5 days and 8 days respectively prior to filtration. The fourth crop after drying for 5 hours at room temperature and 0.15 mm. pressure was found to contain 14.64% nitrogen (theory, 15.03%) and 11.2% nickel (theory, 10.50%).

EXAMPLE 28

A mixture of 3.76 parts of 2-iminocoumarin-3-carboxamide and 2.00 parts of hydroxylamine hydrochloride in 100 parts of 95% ethanol was stirred mechanically for several hours and the mixture allowed to stand overnight, after which time the solid was removed by filtration. The filtrate was next reduced in volume, and a second crop of solid was recovered as above. The two crops of solid were combined and recrystallized from 95% ethanol, giving 2.3 parts of a yellow, crystalline solid which was identified as 2-oximinocoumarin-3-carboxamide [decomposed at 260° C. without definitely melting and contained on analysis for $C_{10}H_8N_2O_3$, 59.50% carbon (theory, 58.82%), 3.97% hydrogen (theory, 3.95%) and 13.31% nitrogen (theory, 13.72%)].

To a solution of 1.70 parts of the 2-oximinocoumarin-3-carboxamide obtained above in 150 parts of boiling methanol was added a solution of 1.04 parts of nickel acetate tetrahydrate in 50 parts of methanol followed by a solution of 0.55 part of 85% potassium hydroxide in 50 parts of methanol. The mixture was next filtered to remove a trace of brown impurity, the filtrate reduced in volume by distilling off most of the solvent, and the run stored at 0–5° C. After several days, the nickel salt which had formed was removed by filtration and washed with methanol. The orange-brown product (15% yield based on coumarin) was identified as the nickel salt of 2-iminocoumarin-3-carboxamide-N-oxide and, on analysis for $C_{20}H_{14}N_4NiO_6$, contained 51.2% carbon (theory, 51.65%), 3.6% hydrogen (theory, 3.03%) and 12.17% nickel (theory, 12.62%). A second crop of solid which was obtained by diluting the latter filtrate with water raised the total yield to 63%. The masstone ink was a transparent reddish-brown and the tint ink a reddish-tan.

EXAMPLES 29 to 32

The general procedure of Examples 3 to 25 was repeated except that in these examples salicylaldehyde was condensed with the following substituted cyanoacetamides: N-phenylamino cyanoacetamide (Example 29); N-benzal-iminocyanoacetamide (Example 30); N-acetamidocyanoacetamide (Example 31) and N-2-pyridylmethylcyanoacetamide (Example 32). Details, analysis and evaluation of the nickel salts of these examples are given below in Table 2.

TABLE 2

| | | | | Nickel salt | | | | | | | |
|---|---|---|---|---|---|---|---|---|---|---|---|
| | | | | Analyses | | | | | | | |
| | | | | Percent carbon | | Percent hydrogen | | Percent nitrogen (Dumas) | | Percent nickel (direct ash) | |
| Example number | Solvent [1] | Yield, percent [2] | Formula | Theory | Found | Theory | Found | Theory | Found | Theory | Found | Color, masstone |
| 29 | MC | 88 | $C_{32}H_{24}N_6NiO_4$ | 62.47 | 62.6 | 3.93 | 4.0 | 13.66 | 13.74 | 9.54 | 9.1 | Brown. |
| 30 | MC | 57 | $C_{34}H_{24}N_6NiO_4$ | 63.88 | 64.37 | 3.78 | 4.25 | 13.15 | 13.55 | 9.18 | 5.67 | Red. |
| 31 | M | 95 | $C_{34}H_{20}N_6NiO_6$ | 52.68 | 52.44 | 3.68 | 4.24 | 15.36 | 15.01 | 10.73 | 10.22 | Brown. |
| 32 | M | 74 | $C_{23}H_{24}N_6NiO_4 \cdot 2H_2O$ | 59.01 | 58.91 | 4.33 | 4.36 | 12.91 | 13.31 | 9.01 | 9.5 | Red-brown. |

[1] MC=2-methoxyethanol; M=methanol.
[2] Based on iminocoumarin.

EXAMPLE 33

The procedure of Example 3 was repeated except that salicylaldehyde was condensed with cyanothioacetamide. The nickel salt was a brownish-red pigment which analyzed 11.6% nitrogen (Kjeldahl), 12.07% nickel and 13.6% sulfur (calculated for $C_{20}H_{14}N_4NiO_2S_2$, 12.05% nitrogen, 12.62% nickel and 13.78% sulfur).

EXAMPLES 34 to 38

Mixed nickel salts of 2-iminocoumarin-3-carboxamide were prepared by adding a soltion of a mixture of the 2-iminocoumarin-3-carboxamide prepared in Example 1 or the 5,6-benzo analog prepared in Example 2 and various second chelating agents in a solvent to a solution of the calculated amount of nickel acetate tetrahydrate in methanol. The solid which formed was filtered off, washed with methanol and dried for several hours at 100° C. under 0.1 mm. pressure. The mixed salt formation was established by X-ray analysis, as compared with analyses for the individual salts. Details for these examples and analyses for and evaluation of the products obtained are given in Table 3 below.

TABLE 3.—MIXED NICKEL SALTS

| Example Number | Chelating agents | Solvent [1] | Yield (percent) [2] | Formula | Analyses [3] | | | | Color, Masstone |
|---|---|---|---|---|---|---|---|---|---|
| | | | | | Carbon | Hydrogen | Nitrogen (Dumas) | Nickel (direct ash) | |
| 34 | 2-iminocoumarin-3-carboxamine and dimethylglyoxime. | M | 88 | $C_{14}H_{14}N_4NiO_4$ | 46.1 (46.6) | 3.9 (3.9) | 15.7 (15.5) | 15.9 (16.3) | Brownish-red. |
| 35 | 2-iminocoumarin-3-carboxamide and 1-anilino-1,2,3-butanetrione-2,3-dioxime. | M | 88 | $C_{20}H_{17}N_5NiO_5$ | 51.5 (51.6) | 4.0 (3.7) | 15.0 (15.0) | 12.3 (12.6) | Deep red. |
| 36 | 2-iminocoumarin-3-carboxamide and 1-nitroso-2-naphthol. | MC | 75 | $C_{20}H_{13}N_3NiO_4$ | 56.9 (57.5) | 3.3 (3.1) | 10.1 (10.1) | 13.9 (14.0) | Charcoal gray. |
| 37 | 2-iminocoumarin-3-carboxamide and 2-(2-hydroxy-5-methylphenyl)-benzotriazole. | MC | 87 | $C_{23}H_{17}N_5NiO_3$ | | | 14.6 (14.9) | 12.5 (12.5) | Dark red. |
| 38 | 2-imino-5,6b-enzocoumarin-3-carboxamide and dimethylglyoxime. | DMF | 92 | $C_{18}H_{16}N_4NiO_4$ | | | 13.8 (13.6) | 14.1 (14.3) | Deep red. |

[1] M=methanol; MC=2-methoxyethanol; DMF=dimethylformamide.
[2] Based on iminocoumarin.
[3] Percent; theory given in parentheses following figure.

EXAMPLES 39 to 59

Other nickel salts of the invention were prepared by reacting a methanolic solution of the calculated amount (for a 1:2 salt) of nickel acetate tetrahydrate with various imino heterocyclic carboxamides in a suitable solvent according to the general procedure of Example 2. Details of these examples and the pigmentary nickel salts obtained are given below in Table 4.

TABLE 4

| Example No. | Heterocyclic reactant | Solvent[1] | Nickel salt | Color | Formula | Elemental analysis (percent)[2] | | | |
|---|---|---|---|---|---|---|---|---|---|
| | | | | | | Carbon | Hydrogen | Nitrogen (Dumas) | Nickel (direct ash) |
| 39 | 2-iminocyclohepta-(b)-furan-3-carboxamide [Ito et al., Tetrahedron Letters, 3669 (1965)]. | MC | [structure] | Very dark plum-red. | $C_{20}H_{14}N_4NiO_4$ | 55.2 (55.5) | 3.4 (3.3) | 12.4 (12.9) | 12.7 (13.6) |
| 40 | 1,2-dihydro-2-imino-1-methylquinoline-3-carboxamide [prepared by reacting 2-aminoquinoline-3-carboxamide (Tyler, J. Chem. Soc., 203 (1955)) with iodomethane followed by treatment with potassium hydroxide]. | DMF | [structure] | Orange | $C_{22}H_{20}N_6NiO_2$ | 57.6 (57.6) | 4.6 (4.5) | 18.2 (18.3) | 12.6 (12.8) |
| 41 | 1-carboxymethyl-1,2-dihydro-2-iminoquinoline-3-carboxamide (prepared by reacting 2-aminoquinoline-3-carboxamide with chloroacetic acid and then with potassium hydroxide). | DMF | [structure] | Orange-red | $C_{15}H_{16}N_5NiO_4$ | | | | [3]15.2 (15.6) |
| 42 | 1-benzyl-1,2-dihydro-2-imino-2-iminoquinoline-3-carboxamide (prepared by reacting 2-aminoquinoline-3-carboxamide with benzyl chloride and then with potassium hydroxide). | DMF | [structure] | Orange | $C_{17}H_{21}N_5NiO_2$ | | | 18.0 (18.1) | 15.1 (5.2) |
| 43 | 1,2-dihydro-2-imino-1,4,6-trimethylpyridine-3-carboxamide [prepared by reacting 2-amino-4,6-dimethylpyridine-3-carboxamide (Dornow and Neuse, Ber. 84, 296, (1951)) with iodomethane and then with potassium hydroxide]. | M | [structure] | do | $C_{18}H_{24}N_6NiO_2$ | 51.9 (52.1) | 5.9 (5.8) | 20.2 (20.2) | 14.1 (14.1) |
| 44 | 1,2-dihydro-2-imino-1-methyl-6-phenylpyridine-3-carboxamide (prepared by condensing phenylpropargyl aldehyde with cyanoacetamide and then reacting the 2-cyano-5-phenyl-pent-2-en-4-ynoic acid amide so formed with methylamine). | M | [structure] | do | $C_{26}H_{24}N_6NiO_2$ | | | 16.1 (16.4) | 11.2 (11.5) |

See footnotes at end of table.

TABLE 4.—Continued

| Example No. | Heterocyclic reactant | Solvent[1] | Nickel salt | Color | Formula | Elemental analysis (percent)[2] | | | |
|---|---|---|---|---|---|---|---|---|---|
| | | | | | | Carbon | Hydrogen | Nitrogen (Dumas) | Nickel (direct ash) |
| 45 | 1,2-dihydro-2-imino-1,6-diphenylpyridine-3-carboxamide (prepared as in Ex. 44 except that aniline was substituted for methylamine). | M-DMF | | ....do...... | $C_{36}H_{28}N_6NiO_2$ | ........ | ........ | 13.4 (13.2) | 9.3 (9.2) |
| 46 | 1,2,5,6-tetrahydro-2-imino-1-methylbenzo(h)-quinoline-3-carboxamide (prepared by condensing 1-chloro-3,4-dihydro-naphthalene-2-carboxaldehyde with cyanoacetamide followed by treatment with methylamine). | DMS-M | | Red........ | $C_{30}H_{28}N_6NiO_2$ | ........ | ........ | 14.5 (14.9) | 10.5 (10.4) |
| 47 | 1,6-dihydro-6-imino-1-phenylpyridazine-5-carboxamide [prepared by condensing glyoxal monophenyl hydrazone (Fischer and Taube, Ber. 59, 856 (1926)) with cyanoacetamide]. | M | | Orange-red.. | $C_{22}H_{18}N_8NiO_2$ | 54.5 (54.5) | 3.9 (3.7) | 23.4 (23.0) | 11.8 (12.1) |
| 48 | 1,6-dihydro-6-imino-1-(4-nitrophenyl)pyridazine-5-carboxamide (prepared by condensing glyoxal mono-4-nitrophenyl hydrazone with cyanoacetamide). | MC | | ....do...... | $C_{22}H_{16}N_{10}Ni O_6 \cdot 2H_2O$ | ........ | ........ | 22.9 (22.9) | 9.4 (9.6) |

See footnotes at end of table.

TABLE 4.—Continued

| Example No. | Heterocyclic reactant | Solvent[1] | Nickel salt | Color | Formula | Elemental analysis (percent)[2] | | | |
|---|---|---|---|---|---|---|---|---|---|
| | | | | | | Carbon | Hydrogen | Nitrogen (Dumas) | Nickel (direct ash) |
| 49 | 1-(2,4,6-trichlorophenyl)-1,6-dihydro-6-iminopyridazine-5-carboxamide (prepared by condensing glyoxal mono-2,4,6-trichlorophenylhydrazone with cyanoacetamide). | E | | Red | $C_{22}H_{12}Cl_4N_8NiO_2$ | | | 16.0 (16.2) | 8.1 (8.6) |
| 50 | 3-cyano-1,6-dihydro-6-imino-1-phenylpyridazine-5-carboxamide (prepared by reacting 2-cyanoglyoxal-2-phenylhydrazone (Borsche et al, Ann. 512, 101 (1934)) with cyanoacetamide]. | M | | Red | $C_{24}H_{16}N_{10}NiO_2$ | | | | 11.1 (11.0) |
| 51 | 3-benzoyl-1,6-dihydro-6-imino-1-phenylpyridazine-5-carboxamide [prepared by reacting 2-benzoylglyoxal-2-phenylhydrazone (Beyer and Claisen, Ber. 21, 1697 (1888)) with cyanoacetamide]. | DMF | | Red | $C_{36}H_{26}N_8NiO_4$ | 61.8 (62.4) | 4.2 (3.9) | 15.9 (16.2) | 8.2 (8.5) |
| 52 | 3-benzoyl-1,6-dihydro-6-imino-1-(4-nitrophenyl)-pyridazine-5-carboxamide [prepared by reacting 2-benzoylglyoxal-2-(4-nitrophenyl)hydrazone with cyanoacetamide]. | MC | | Orange-red | $C_{36}H_{24}N_{10}NiO_8\cdot2H_2O$ | | | 17.3 (17.1) | 7.4 (7.2) |

See footnotes at end of table.

TABLE 4.—Continued

| Example No. | Heterocycle reactant | Solvent [1] | Nickel salt | Color | Formula | Elemental analysis (percent) [2] | | | |
|---|---|---|---|---|---|---|---|---|---|
| | | | | | | Carbon | Hydrogen | Nitrogen (Dumas) | Nickel (direct ash) |
| 53 [4] | 3-benzoyl-1,6-dihydro-6-imino-1-(4-methoxyphenyl)-pyridazine-5-carboxamide [prepared by reacting 2-benzoylglyoxal-2-(4-methoxyphenyl)hydrazone with cyanoacetamide]. | DMF | | Do | $C_{38}H_{30}N_8NiO_6 \cdot 2H_2O$ | 58.3 (57.8) | 4.4 (4.3) | 14.4 (14.2) | 7.5 (7.4) |
| 54 [4] | 3-benzoyl-1-(2,5-dichlorophenyl)-1,6-dihydro-6-iminopyridazine-5-carboxamide [prepared by reacting 2-benzoylglyoxal-2-(2,5-dichlorophenyl)hydrazone with cyanoacetamide]. | DMF | | Maroon | $C_{36}H_{22}Cl_4N_8NiO_4 \cdot 2H_2O$ | 50.0 (49.9) | 3.1 (3.0) | 12.9 (12.9) | 6.4 (6.8) |
| 55 | 2-imino-2H-1-benzothiapyran-3-carboxamide (prepared by condensing thiosalicylaldehyde with cyanoacetamide). | E | | Red | $C_{20}H_{14}N_4NiO_2S_2$ | 51.5 (51.6) | 3.0 (4.1) | (³) | (³) |
| 56 | 3-acetyl-1,6-dihydro-6-imino-1-phenylpyridazine-5-carboxamide (prepared by reacting 2-acetylglyoxal-2-phenylhydrazone with cyanoacetamide). | DMF | | Red | $C_{26}H_{22}N_8NiO_4$ | 54.6 (54.9) | 4.3 (3.9) | 19.2 (19.7) | 10.0 (10.3) |

See footnotes at end of table.

TABLE 4.—Continued

| Example No. | Heterocyclic reactant | Solvent [1] | Nickel salt | Color | Formula | Elemental analysis (percent) [2] | | | Nickel (direct ash) |
|---|---|---|---|---|---|---|---|---|---|
| | | | | | | Carbon | Hydrogen | Nitrogen (Dumas) | |
| 57 | 3-ethoxycarbonyl-1,6-dihydro-6-imino-1-phenylpyridazine-5-carboxamide (prepared by reacting 2-ethoxycarbonylglyoxal-2-phenylhydrazone with cyanoacetamide). | DMF | | Red | $C_{28}H_{26}N_8NiO_6 \cdot 2H_2O$ | | | 16.8 (16.8) | 9.0 (8.8) |
| 58 | 1,2-dihydro-2-imino-1-(2,4-dinitrophenyl)-quinoline-3-carboxamide (prepared by reacting 2-iminoquinoline-3-carboxamide with 1-chloro-2,4-dinitrobenzene and then with potassium hydroxide). | DMF | | Red | $C_{16}H_{14}N_4NiO_4$ | | | 19.1 (18.9) | 13.4 (13.2) |
| 59 | 1,2-dihydro-2-imino-1-(4-nitrophenyl)-quinoline-3-carboxamide (prepared by reacting 2-iminoquinoline-3-carboxamide with 1-chloro-4-nitrobenzene and then with potassium hydroxide). | DMF | | Orange-red | $C_{32}H_{28}N_9NiO_7$ | | | 18.1 (17.9) | 15.2 (15.0) |

[1] MC=2-methoxyethanol; DMF=dimethylformamide; M=methanol; M-DMF=methanol-dimethylformamide; DMS-M=dimethylsulfoxide-methanol; E=ethanol.
[2] Theory given in parentheses following figure.
[3] Dimethylglyoxime method.
[4] Dried in open dish.
[5] Insufficient sample for nitrogen and nickel analyses.

What I claim and desire to protect by Letters Patent is:

1. A pigment composition comprising a nickel salt having a formula selected from the group consisting of

I

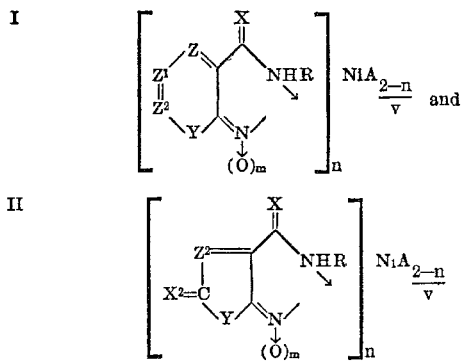

where R is selected from the group consisting of hydrogen, —NHalkyl, —NHacyl, —NHaryl, —NHaralkyl, —N=CHaryl and a heterocyclic substituted alkyl group; X is oxygen or sulfur; $X^1$ is oxygen, sulfur, $NR^1$ or $CHR^1$ where $R^1$ is hydrogen or an inert organic radical; Y is oxygen, sulfur, $NR^1$ or, together with $X^1$ forms a 5–7-membered ring; Z is nitrogen, N→O or $CR^2$ where $R^2$ is hydrogen, hydroxyl or a hydrocarbon group; $Z^1$ is nitrogen or $CR^3$ where $R^3$ is hydrogen, an inert radical or together with $R^2$ forms a 5–7 membered ring; $Z^2$ is nitrogen or $CR^4$ where $R^4$ is hydrogen, hydroxyl, an inert organic radical or together with $R^3$ forms a 5–7 membered ring; $Z^3$ is nitrogen or $CR^5$ where $R^5$ is hydrogen, an inert organic radical or together with $X^1$ forms a 5–7 membered ring; A is an anion; $m$ is 0 or 1; $n$ is 1 or 2; and $v$ is the valence of anion A, with the further provision that at least one of Z, $Z^1$ and $Z^2$ contains carbon and a pigment vehicle selected from the group consisting of inks and enamels.

2. The composition of claim 1 wherein the nickel salt has the formula

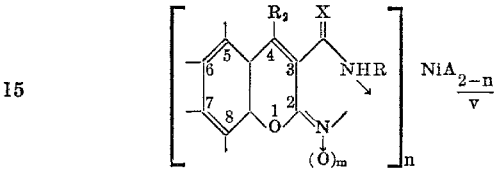

where R, $R^2$, X, A, $n$, $m$ and $v$ are as indicated in claim 1.

3. The composition of claim 2 wherein the nickel salt is the nickel salt of 2-imino-5,6-benzocoumarin-3-carboxamide.

4. The composition of claim 2 wherein the nickel salt is the nickel salt of 2-imino-6-tert-octylcoumarin-3-carboxamide.

No references cited.

TOBIAS E. LEVOW, Primary Examiner

J. V. HOWARD, Assistant Examiner

U.S. Cl. X.R.

106—23

PO-1050
(5/69)

UNITED STATES PATENT OFFICE
CERTIFICATE OF CORRECTION

Patent No. 3,627,552            Dated December 14, 1971

Inventor(s) Albert S. Matlack (Case 27-28)

It is certified that error appears in the above-identified patent and that said Letters Patent are hereby corrected as shown below:

In the formula I, Column 1 - far right side of second bracket:
"$N_2A_{\underline{2-n}}$" should read --$NiA_{\underline{2-n}}$--
      v                               v Column 1, printed line 15; (line 4 of abstract)
    "nickel salt" should read --a nickel halide or a nickel salt--

Column 4, line 6; "thiazoline" should read --oxazoline--

Column 5, printed line 18; "1,5" should read --1,6--

Column 10, Table 1 under Column entitled Formula, Exp. 15, 16, 17, and 18;
    "$NiO_4$" should read --$NiO_6$--

Column 10, Table 1, 2nd Section under last column entitled Found, Exp. 13;
    "9.17" should read --9.7--

Column 10, line 54;
    "0.55" should read --0.05--

Column 11, Table 2, Exp. 31 in the column entitled Formula;
    "$C_{34}$" should read --$C_{24}$--

Column 11, Table 2, Exp. 32 in the column entitled Formula;
    "$C_{23}$" should read --$C_{32}$--

PO-1050
(5/69)

UNITED STATES PATENT OFFICE
CERTIFICATE OF CORRECTION

Patent No. 3,627,552            Dated December 14, 1971

Inventor(s) Albert S. Matlack    (Case 27-28)        Page 2

It is certified that error appears in the above-identified patent and that said Letters Patent are hereby corrected as shown below:

Column 11, Table 3, Exp. 34, second column;
"3-carboxamine" should read -- 3-carboxamide--

Column 11, Table 3, Exp. 38, second column;
"5,6b-enzocoumarin" should read --5,6-benzocoumarin- Column 17, formula in Exp. 50;

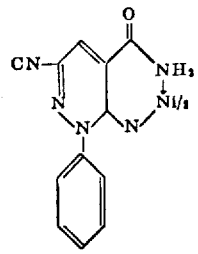  should read  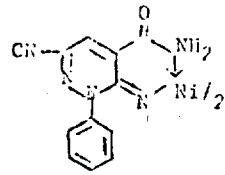

Column 21, formula in Exp. 58;

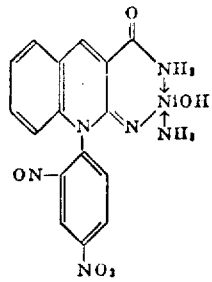  should read  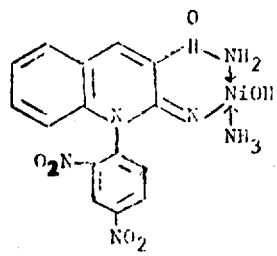

Column 23, Claim 1, formula II;

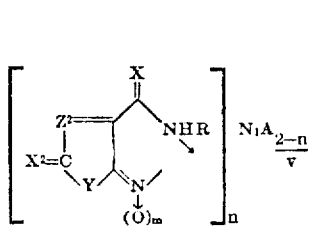  should read  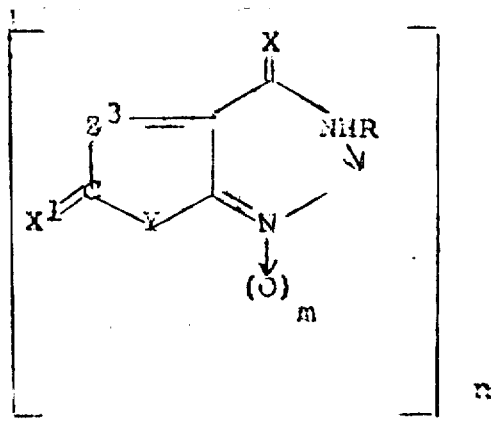

PO-1050
(5/69)

UNITED STATES PATENT OFFICE
CERTIFICATE OF CORRECTION

Patent No. 3,627,552           Dated   December 14, 1971

Inventor(s) Albert S. Matlack    (Case 27-28)       Page 3

It is certified that error appears in the above-identified patent and that said Letters Patent are hereby corrected as shown below:

Claim 2, Column 24 in the formula;

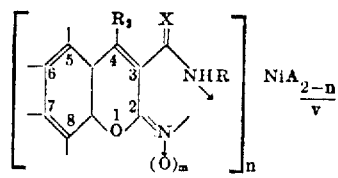

should read

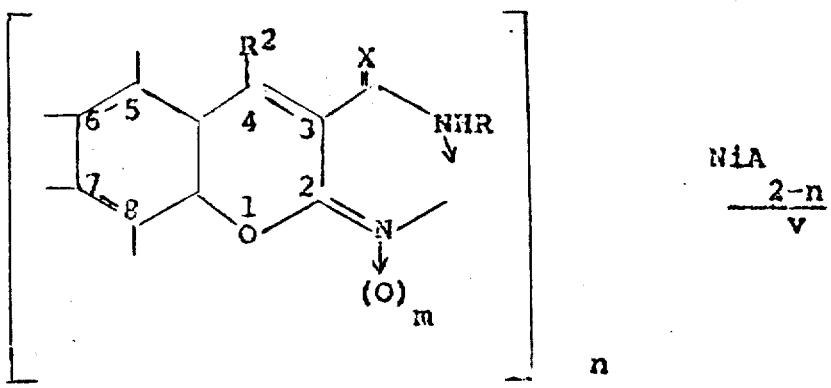

Signed and sealed this 6th day of June 1972.

(SEAL)
Attest:

EDWARD M. FLETCHER, JR.          ROBERT GOTTSCHALK
Attesting Officer                  Commissioner of Patents